(12) United States Patent
Sou

(10) Patent No.: US 7,577,226 B2
(45) Date of Patent: Aug. 18, 2009

(54) CLOCK RECOVERY CIRCUITRY

(75) Inventor: Antony Sou, Manchester (GB)

(73) Assignee: Fujitsu Microelectronics Limited, Tokyo (JP)

( * ) Notice: Subject to any disclaimer, the term of this patent is extended or adjusted under 35 U.S.C. 154(b) by 480 days.

(21) Appl. No.: 10/315,088

(22) Filed: Dec. 10, 2002

(65) Prior Publication Data
US 2003/0161430 A1 Aug. 28, 2003

(30) Foreign Application Priority Data
Feb. 26, 2002 (GB) .................... 0204497.2

(51) Int. Cl.
*H03D 3/24* (2006.01)
(52) U.S. Cl. .................. 375/376; 370/395.62; 375/371; 398/155; 713/600
(58) Field of Classification Search .............. 327/141, 327/158; 375/130, 371, 373, 376, 143
See application file for complete search history.

(56) References Cited

U.S. PATENT DOCUMENTS

| 4,630,283 | A | * | 12/1986 | Schiff ..................... 375/143 |
| 4,672,639 | A | * | 6/1987 | Tanabe et al. ............ 375/371 |
| 5,187,479 | A | | 2/1993 | Johnson et al. |
| 5,315,299 | A | | 5/1994 | Matsumoto |
| 5,977,822 | A | | 11/1999 | Rybicki et al. |
| 6,125,157 | A | * | 9/2000 | Donnelly et al. ............ 375/371 |
| 6,247,138 | B1 | * | 6/2001 | Tamura et al. .............. 713/600 |
| 2001/0026179 | A1 | | 10/2001 | Saeki |

FOREIGN PATENT DOCUMENTS

| EP | 0 746 111 A1 | 12/1996 |
| EP | 0 952 568 A1 | 10/1999 |
| GB | 2 240 241 A | 7/1991 |

OTHER PUBLICATIONS

"High-Speed Clock & Data Recovery Macro for Data Transfer at 622 Mbits/sec", *Fujitsu Spectrum*, No. 123, Jun. 2001, pp. 3-6.

* cited by examiner

*Primary Examiner*—David C Payne
*Assistant Examiner*—Adolf Dsouza
(74) *Attorney, Agent, or Firm*—Arent Fox LLP

(57) ABSTRACT

Clock recovery circuitry for recovering a clock signal from a data signal is disclosed. The clock recovery circuitry comprises sampling unit (46) for sampling the data signal at a plurality of sampling points, bit reversal detecting unit (48) for determining a sampling point at which the data signal changes state, selecting unit (50) for selecting a phase from amongst a plurality of candidate phases based on a sampling point at which the data signal is determined to change state, and phase setting unit (38) for setting the phase of the clock signal. The circuitry may be used to produce an estimate of a desired phase of the clock signal for supply to a phase locked loop. This can allow the phase locked loop to be brought quickly into lock.

21 Claims, 9 Drawing Sheets

CLOCK RECOVERY CIRCUITRY

BACKGROUND TO THE INVENTION

The invention relates to clock recovery circuitry for recovering a clock signal from a data signal.

When receiving an asynchronous data signal, a clock signal is usually recovered from the received data signal and used to sample the data signal. Known clock recovery circuits use a phase locked loop to lock the phase of a reference clock to the phase of the received data signal, in order to recover a clock signal.

A problem in known clock recovery circuits is that it may take many clock cycles for the phased locked loop to lock onto the data signal, in particular if high speed data signals are being received. If data is received in bursts, then the phase locked loop may need to lock onto each burst of data separately, which may result in a relatively large proportion of the total transmission time being used for clock recovery.

In order to increase the speed with which a phase locked loop locks onto a data signal, it is possible to increase the loop gain of the phase locked loop. However, this may have the effect of increasing jitter in the recovered clock signal. Furthermore, in the case of high speed data signals, it may still take many clock cycles before the phase locked loop is locked onto the data signal.

SUMMARY OF THE INVENTION

According to a first aspect of the invention there is provided clock recovery circuitry for recovering a clock signal from a data signal, comprising:
sampling means for sampling the data signal at a plurality of sampling points;
bit reversal detecting means for determining a sampling point at which the data signal changes state;
selecting means for selecting a phase from amongst a plurality of candidate phases based on a sampling point at which the data signal is determined to change state; and
setting means for setting the phase of the clock signal in dependence on the selected phase.

The clock recovery circuitry of the present invention can allow the phase of the clock signal to be set to close to its desired value in a short period of time, for example, within 16 bits. Therefore the clock signal can be used to recover the data signal without the long delay that might be required by a phase locked loop to lock onto the data signal.

The sampling means may comprise means for sampling the data signal with a plurality of sampling clock signals having substantially the same frequency, but different phases. In this case, each sampling point corresponds to a clock signal having a particular phase. The clock signals are preferably at or very close to the frequency of the data signal (for example, within 1% or 0.1%), or at some multiple or fraction of the frequency of the data signal. The clock recovery circuitry may further comprise a multiphase clock generator for producing the plurality of sampling clock signals.

Preferably, the number of sampling clock signals is at least three, so that the sampling point at which the data signal is determined to have changed state is as close as is practicable to the actual point at which the data changed state. For example, 4, 8, 16 or some other number of sampling clock signals may be used. Preferably the sampling clock signals have approximately evenly spaced phases, although sampling clock signals with unevenly spaced phases may also be used.

The bit reversal detecting means may comprise means for comparing the data sampled at a sampling point with the data sampled at a previous sampling point, thereby to determine a sampling point at which the data signal changes state. The bit reversal detecting means may be arranged to determine a sampling point at which the data signal changes state for a plurality of data transitions.

In one embodiment of the invention, the most recent sampling point at which the data signal is determined to have changed state is used to select the phase. Thus, a signal indicating the sampling point at which the data signal is determined to have changed state may be supplied from the bit reversal detecting means to the selecting means for determining which phase is selected by the selecting means. In this embodiment, once the circuit is initialised (for example, at the start of a data burst, or at some predetermined time after the start of a data burst), the first sampling point at which the sampled data changes state is used to select a phase. This may allow the setting means to set the phase of the clock signal in the shortest time possible.

In an alternative embodiment, a phase is selected based additional criteria. Thus, the clock recovery circuitry may further comprise selection control means for producing a selection control signal for determining which phase is selected by the selecting means. The selection control means may be arranged to receive a plurality of signals, each signal indicating the sampling point at which the data signal is determined to have changed state for a particular data transition, and to produce therefrom a signal for output to the selecting means.

For example, assuming the sampling points occur periodically, the selection control signal may be a signal indicating at which sampling point the data signal is determined to have changed states the greatest number of times. This may allow the phase of the clock signal to be set with greater accuracy than if a single data transition were used. As an alternative, the average sampling point could be determined based on all of the sampling points at which the data signal is determined to have changed states.

Alternatively, the selection control means may be arranged to change the value of the selection control signal in steps of a predetermined size. In this case, the currently selected phase may be moved towards the phase corresponding to the most recent sampling point at which the data signal is determined to have changed state one step at a time. The size of the steps may be, for example, one phase, or more. This may allow a phase to be selected quickly, while reducing the effect of spuriously detected data edges.

The selecting means may be arranged to select, from amongst the plurality of candidate phases, a phase having a required offset from the phase of the data signal. This may allow the clock signal to sample the data signal away from the data edges. For example, the clock signal may sample the data signal in the middle of the data eye, or at some point before or after the middle of the data eye, depending on the shape of the data eye. The offset may be either preset, or user controlled.

The clock recovery circuitry may further comprise a phase detector for determining a difference between the phase of the clock signal and the phase of the data signal, a filter for filtering the output of the phase detector to produce a control signal, and control signal selection means for selectively supplying either the control signal from the filter, or the selected phase from the selecting means, to the setting means to set the phase of the clock signal. The phase detector, filter and phase setting means may form a phase locked loop, such as a digital phase locked loop.

The above arrangement may allow the circuit to operate in one of two modes, depending on the signal which is selected by the control signal selection means. In the first mode, the phase of the clock signal is set to be the phase selected by the selecting means. In this mode, an estimate of the desired phase of the clock signal may be produced in a short period of time, and so the clock signal may be brought quickly towards its desired phase. In the second mode, the phase of the clock signal is set by the filter. In this mode, the circuit may function as a phase locked loop. This may provide more accurate locking of the phase of the clock signal to the phase of the data signal.

The clock recovery circuitry may further comprise control means for controlling the control signal selection means, in order to control whether and at what time the selected phase is supplied to the setting means. The control means may be arranged to supply the selected phase from the selecting means to the setting means during a first part of a data burst, for example, while a header of the data burst is being received. Once the selected phase has been supplied to the setting means, the control means may be arranged to supply the control signal from the filter to the setting means. In this way, the phase of the clock signal may be brought quickly to a near lock state during the first part of a data burst, and then the phase locked loop may be used to achieve the final lock.

The control means may alternatively or additionally be arranged to supply the selected phase from the selecting means to the setting means at other times, such as a time at which the phase locked loop loses lock, or when a certain type of data is being received. If desired, the control means may be arranged to supply the selected phase to the setting means during the whole of a data burst.

Preferably, the control signal output by the filter is a digital signal indicating one phase out of a predetermined number of phases. The number of predetermined phases may be different from the number of candidate phases for selection by the selecting means, because the phased lock loop may have more gradations than the selecting means. However, in this case, an output of the selecting means may be a digital signal indicating one phase out of the predetermined number of phases. For example, if the number of predetermined phases is sixty four, and the number of candidate phases is eight, the selecting means may output one of eight signals, each of which is a signal indicating one of sixty four possible phases. In this way, the output of the selecting means may be in the same format as the output of the filter. This can allow the output of the selecting means to replace directly the output of the filter, thus facilitating switching between the modes.

The setting means may comprise a phase interpolator which is arranged to receive a plurality of clock signals having different phases, and to produce the clock signal from the plurality of clock signals. The plurality of clock signals may be produced by a multiphase clock generator, which may be the same multiphase clock generator as that used to produce the sampling clock signals for use by the sampling means, or a different one.

According to a second aspect of the invention there is provided a method of recovering a clock signal from a data signal, the method comprising:

sampling the data signal at a plurality of sampling points;
determining a sampling point at which the data signal changes state;
selecting a phase from amongst a plurality of candidate phases based on a sampling point at which the data signal is determined to change state; and
setting the phase of the clock signal in dependence on the selected phase.

According to a third aspect of the invention there is provided clock recovery circuitry which is arranged to recover a clock signal from a data signal, comprising:

a sampler which samples the data signal at a plurality of sampling points;
a bit reversal detector which determines a sampling point at which the data signal changes state;
a selector which selects a phase from amongst a plurality of candidate phases based on a sampling point at which the data signal is determined to change state; and
a phase setting unit which sets the phase of the clock signal in dependence on the selected phase.

Features of one aspect of the invention may be applied to any other aspect; the apparatus features may be applied to the method aspect and vice versa.

Preferred features of the present invention will now be described, purely by way of example, with reference to the accompanying drawings

DESCRIPTION OF PREFERRED EMBODIMENTS OF THE INVENTION

Figure 1:
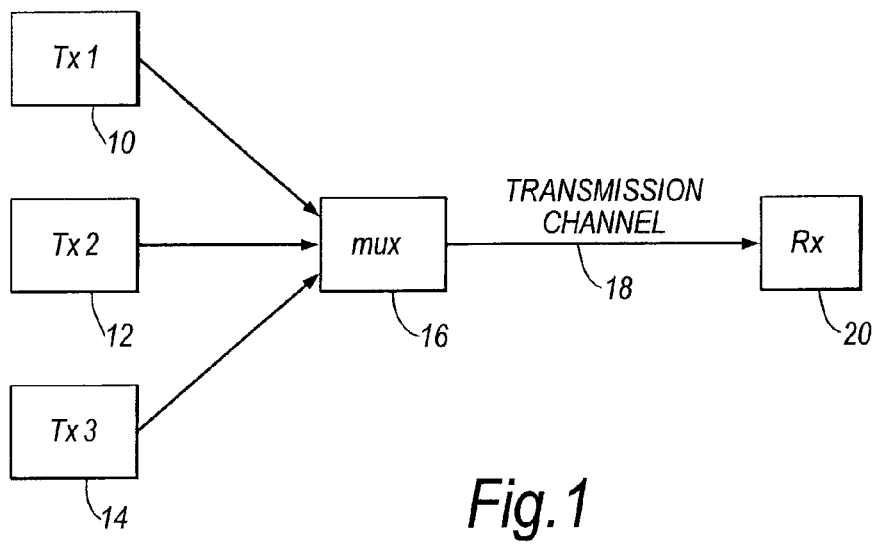
FIG. 1 shows parts of a communications system with which the present invention may be used.

FIG. 1 shows parts of an example communications system with which the present invention may be used. In FIG. 1, three transmitters 10, 12, 14 each transmits a serial data signal. The transmitters operate on a time division multiplex basis, with each transmitter being allocated a window in which it may transmit a burst of data. The various data signals are combined in multiplexer 16, transmitted over transmission channel 18, and received by receiver 20.

The transmitters 10, 12, 14 are arranged such that each transmitter transmits a data signal at the same frequency as the other transmitters. However, due to differences in path length between the transmitters and the receiver, each data signal is received by the receiver with a difference phase. In the receiver, a clock and data recovery (CDR) circuit is provided, which recovers a clock signal from each data burst, and uses the clock signal to recover the data.

Figure 2:
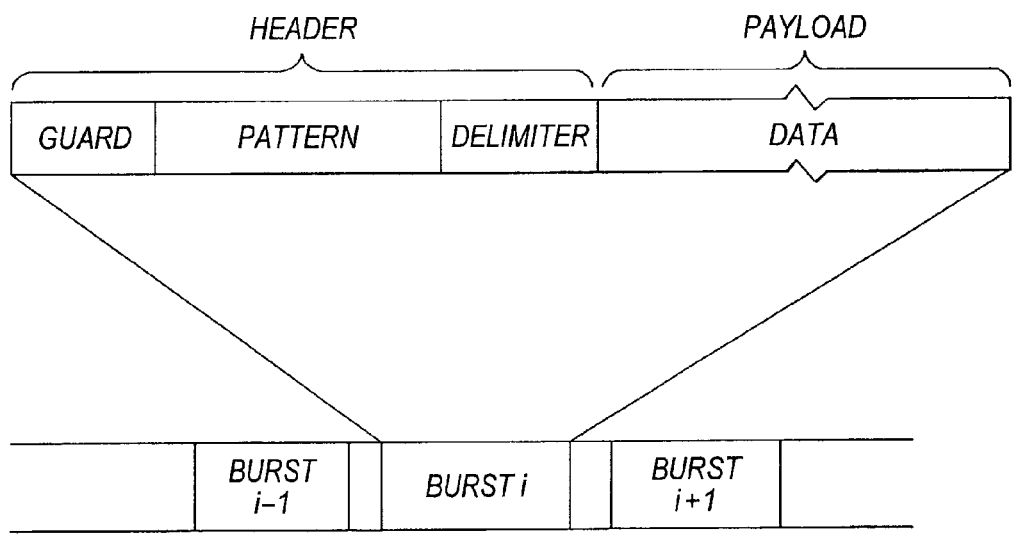
FIG. 2 shows the format of data bursts in the communications system of FIG. 1.

FIG. 2 shows an example of the format of the data bursts transmitted by the transmitters 10, 12, 14. In this example, each data burst comprises a four-byte header and a 53-byte payload containing the useful data. The header comprises a guard byte, two bytes with a predetermined pattern and a delimiter byte. The predetermined pattern consists of alternate ones and zeros, and is used to recover the clock signal.

In the communications system shown in FIGS. 1 and 2, it is necessary for the clock and data recovery circuit to lock on to each new burst of data as it arrives. This must be done during the header, in order to ensure that no data from the payload is lost. It is therefore necessary for the circuit to lock onto the data signal within, say, sixteen bit periods (i.e. the length of the predetermined pattern in the header).

Figure 3:
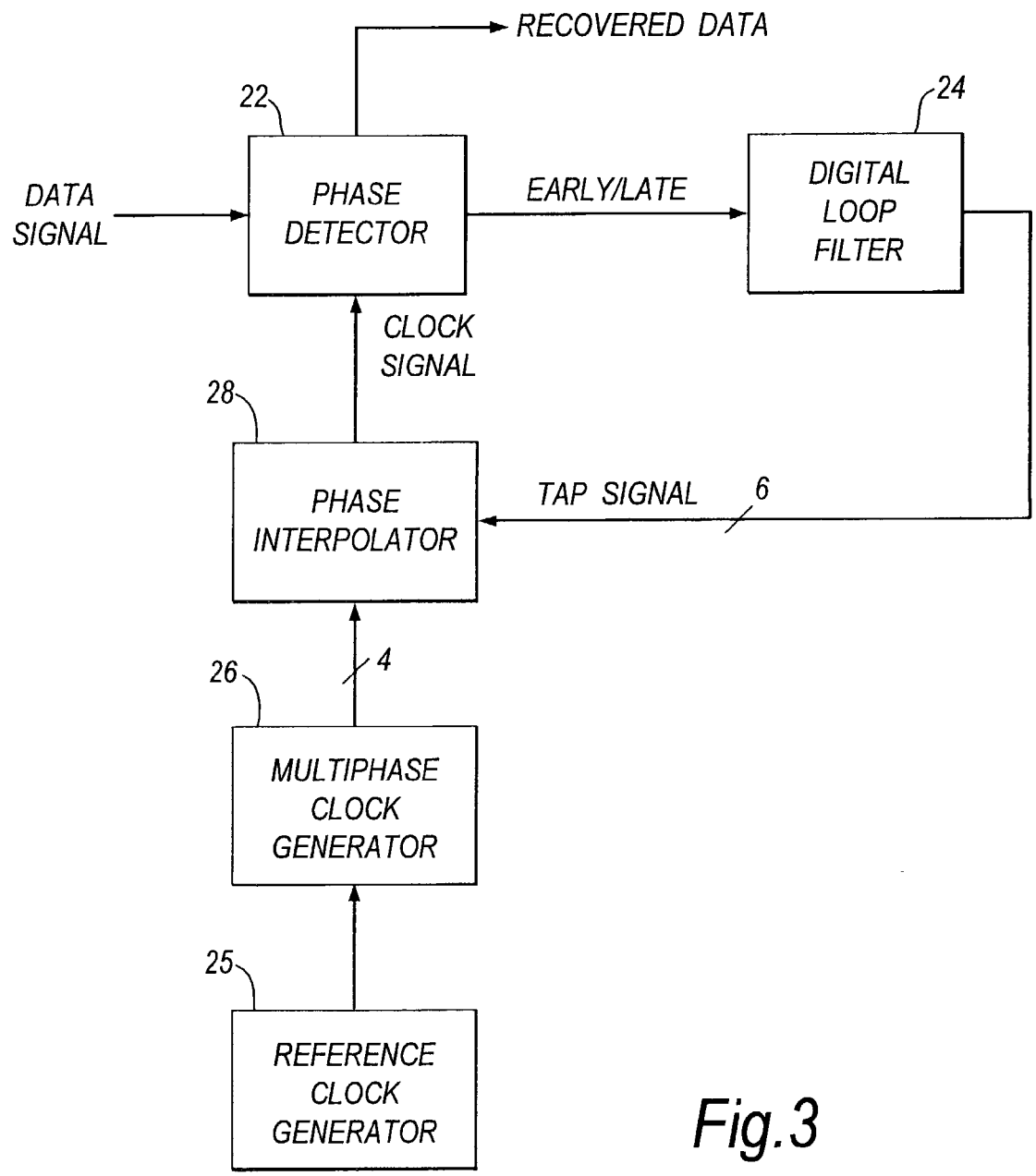
FIG. 3 shows parts of a previously considered clock and data recovery circuit.

FIG. 3 shows parts of a previously considered clock and data recovery circuit. The circuit is a digital phase locked loop which is used to lock the phase of a clock signal to the phase of an incoming data signal.

Referring to FIG. 3, the clock and data recovery circuit comprises phase detector 22, digital loop filter 24, reference clock generator 25, multiphase clock generator 26 and phase interpolator 28. In operation, the reference clock generator 25 produces a reference clock signal which has a frequency which is the same as or very close to the frequency of the incoming data signal. The output of the reference clock generator 25 is fed to multiphase clock generator 26. Multiphase clock generator 26 produces four multiphase clock signals which all have the same frequency, but with phases offset by 90°. The four multiphase clock signals are fed to phase interpolator 28.

Phase interpolator 26 receives the four multiphase clock signals, and a tap signal from the digital loop filter 24. The tap signal is a six-bit signal indicating a desired phase of a clock signal (i.e. one of sixty four possible phases of the clock signal). The phase interpolator 26 mixes the four multiphase clock signals in accordance with the tap signal, to produce an output clock signal with the same frequency as the reference clock signal, but with a phase determined by the tap signal. The thus produced clock signal is fed to phase detector 22.

The phase detector 22 receives the clock signal and the incoming data signal, and produces an early/late signal which indicates whether the clock signal is early or late with respect to the data signal. The early/late signal is fed to digital loop filter 24, which integrates the early/late signal over a number of bit periods and updates the tap signal to indicate the next phase of the clock signal. The tap signal is fed to the phase interpolator 26 which adjusts the phase of the clock signal in dependence thereon. In this way, the phase of the clock signal is locked to the phase of the data signal.

The phase detector 22 in FIG. 3 obtains the early/late signal by sampling the data signal using various versions of the clock signal. One of these sampled data signals is output by the phase detector as the recovered data signal. Thus, in the circuit shown in FIG. 3, it is not necessary to provide a separate latch for sampling the data signal.

A problem with the circuit shown in FIG. 3 is that it may take a large number of cycles for the digital phased locked loop to lock on to the incoming data stream. For example, if the incoming data stream is at a frequency of 622 MHz, it may take hundreds or thousands of clock cycles before lock is achieved. This is due mainly to the latency of the loop, in particular due to the digital loop filter which may have several register stages and may operate at a lower frequency than that of the data stream (for example 78 MHz).

Figure 4:
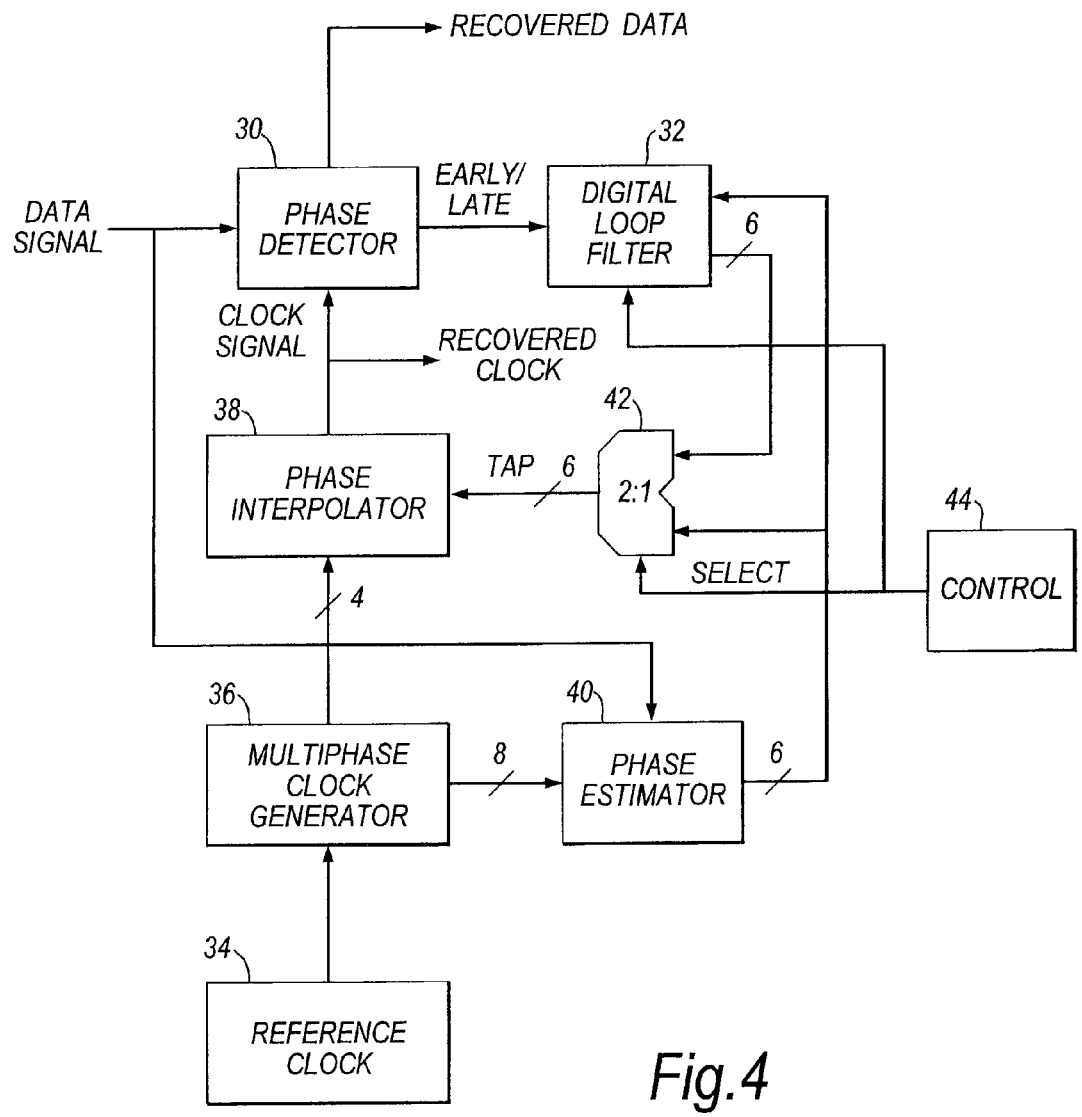
FIG. 4 shows parts of a clock recovery circuit according to a first embodiment of the present invention.

FIG. 4 shows parts of a clock recovery circuit according to a first embodiment of the present invention. Referring to FIG. 4, the clock recovery circuit comprises phase detector 30, digital loop filter 32, reference clock generator 34, multiphase clock generator 36, phase interpolator 38, phase estimator 40, switch 42 and control unit 44. The phase detector 30, digital loop filter 32, reference clock generator 34, multiphase clock generator 36 and phase interpolator 38 have essentially the same function as the corresponding parts shown in FIG. 3, but with certain modifications as will be apparent from the following description.

In operation, multiphase clock generator 36 receives a reference clock signal from reference clock generator 34 and produces a total of eight multiphase clock signals each having the same frequency as each other, but with evenly-spaced phases. Four clock signals with evenly spaced phases (i.e. with spacings of 90°) are fed to phase interpolator 38 for use in producing a clock signal with a phase determined by the tap signal at its input. Eight clock signals with evenly spaced phases (i.e. with spacings of 45°) are fed to phase estimator 40. As will be explained, phase estimator 40 uses the eight clock signals at its input together with the incoming data signal to obtain an estimate of the desired phase of the clock signal.

The clock recovery circuit of FIG. 4 is operable in one of two operation modes, fast mode and continuous mode, in dependence on a select signal output by control unit 44. When in continuous mode the switch 42 selects the tap signal output from digital loop filter 32 and feeds this to the phase interpolator 38. In this mode, the clock recovery circuit functions in the same way as the clock recovery circuit described above with reference to FIG. 3.

When the clock recovery circuit is operating in fast mode, an estimate of the desired phase of the clock signal is produced by phase estimator 40, and this estimate is selected by switch 42 and fed to phase interpolator 38. The estimate is also fed to digital loop filter 32, to update the tap signal which is produced by the filter. The phase estimator 40 is able to produce an estimate of the desired phase of the clock signal in a relatively short period of time, compared to the average time taken for the digital phase locked loop to lock onto the data signal. Thus, by providing an initial estimate of the desired phase of the clock signal and feeding this value into the digital phase locked loop, the digital phase locked loop can be brought quickly into a near-lock state. Once the initial estimate has been fed to the phase locked loop, the circuit is switched to continuous mode and final lock is achieved.

The fast mode is normally selected when a new data burst is first received, and the continuous mode is normally selected once the initial estimate has been fed into the digital phase locked loop. However, fast mode could also be selected in other circumstances, for example if the digital phase locked loop lost lock part of the way through a data burst for some reason, or in dependence on the type of data signal.

In the present embodiment, the tap signal output by the digital loop filter 32 is a six bit digital signal, which indicates which one of 64 possible phases the clock signal at the output of the phase interpolator should have. The output of the phase estimator 40 is also a six bit digital signal which can directly replace the output of the digital loop filter.

Figure 5:
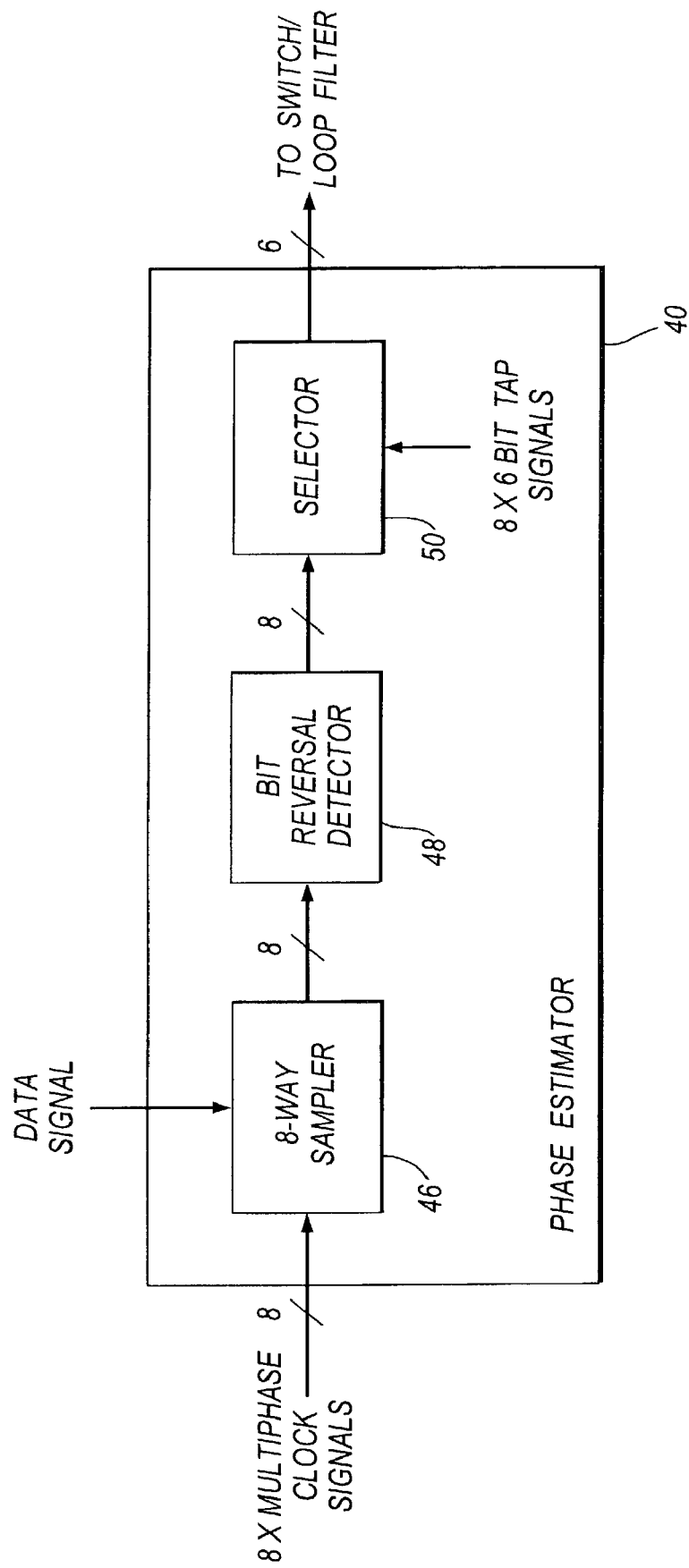
FIG. 5 shows the main parts of one embodiment of the phase estimator.

FIG. 5 shows the main parts of the phase estimator 40. The phase estimator 40 comprises eight-way sampler 46, bit reversal detector 48 and selector 50. In operation, the eight-way sampler 46 receives the eight multiphase clock signals and uses them to sample the incoming data signal at respective sampling points, to produce eight sampled data signals. The eight sampled data signals are fed to bit reversal detector 48, which monitors each of the eight sampled data signals, and detects when a sampled data signal changes its state in comparison to the data signal which was sampled at the preceding sampling point. In this way it is determined at which sampling point a bit reversal occurs. Bit reversal detector 48 outputs a signal indicating the sampling point at which a bit reversal was determined to occur. This signal may either be a change in state on one of eight output lines as indicated in FIG. 5, or it may be a three bit binary signal.

The output of the bit reversal detector 48 is fed to selector 50, which also receives eight six-bit tap signals. The selector 50 selects one of the eight tap signals in dependence on which sampling point was determined to have a bit reversal. Each of the eight tap signals is arranged to represent a phase which would be approximately the correct phase for the clock signal, if a bit reversal occurred at the corresponding sampling point. The selected tap signal is then fed to the switch 42 and digital loop filter 32 in FIG. 4.

Figure 6:
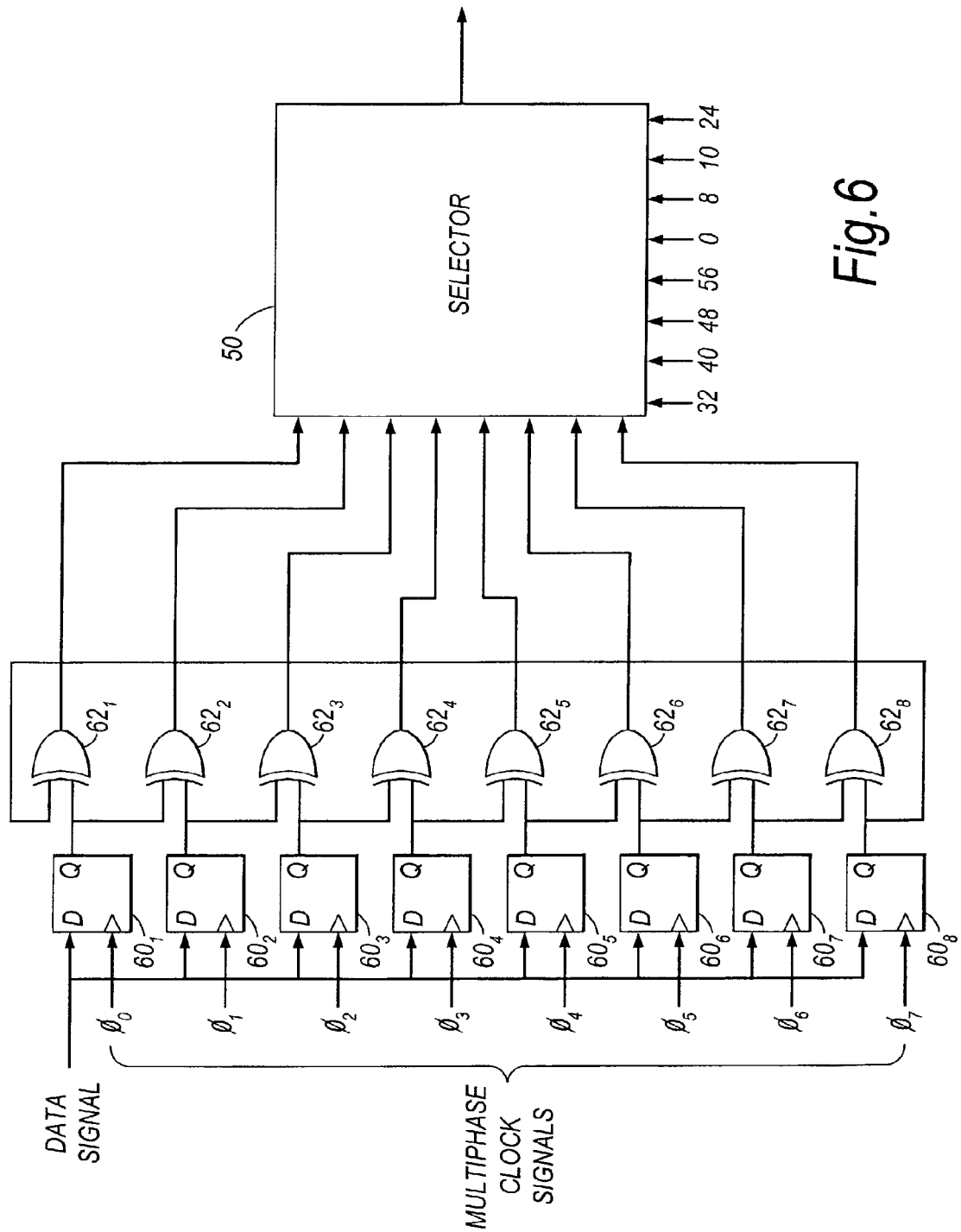
FIG. 6 shows parts of the phase estimator of FIG. 5 in more detail.

FIG. 6 shows in more detail parts of the phase estimator 40. Referring to FIG. 6, the eight-way sampler comprises eight registers $60_1$ to $60_8$ and the bit reversal detector comprises eight EXOR gates $62_1$ to $62_8$. Each of the eight registers $60_1$ to $60_8$ receives a respective one of the eight multiphase clock signals at its clock input, and receives the data signal at its data input. In this way, each of the registers $60_1$ to $60_1$ samples the data signal at a sampling point which is offset from that of the adjacent register.

The output of each register $60_1$ to $60_8$ is fed to a corresponding EXOR gate $62_1$ to $62_8$. Each EXOR gate $62_1$ to $62_8$ also receives the output from the register having the preceding sampling point. When a register has the same output as the register having the preceding sampling point, the output of the corresponding EXOR gate is logic zero. However, if a register has an output which differs from that of the register having the preceding sampling point, then the output of the corresponding EXOR gate is logic one. In this way the outputs of the EXOR gates indicate which of the eight registers changed its state in comparison to the register having the preceding sampling point.

The signals from the respective EXOR gates $62_1$ to $62_8$ are fed to the control inputs of selector 50. Selector 50 also receives the eight tap signals, each of which is a one-of-sixty four tap signal in the same format as the tap signal output by digital loop filter 32 in FIG. 4. The selector 50 selects one of the eight tap signals in dependence on which of the signals from the EXOR gates is logic one. In the example shown in FIG. 6, if the output of EXOR gate $62_1$ is logic one, then tap signal number 32 (i.e. phase number 32 out of 64) is selected by selector 50; if the output of EXOR gate $62_2$ is logic one, then tap signal number 40 is selected by selector 50; and so forth.

In the present embodiment, a sampling point at which a bit reversal occurs is considered to be at a data edge, and the centre of the data eye is taken to be approximately half a bit period away. Assuming that the clock signal should have its rising edge at the centre of the data eye, an estimate of the desired phase of the clock signal can be obtained by adding half a bit period to the sampling point at which the bit reversal occurred. The eight tap signals which are input to the selector 50 are chosen to have the required offset (e.g. half a bit period) from the sampling point at which the bit reversal occurred, so that an estimate of the desired phase of the clock signal is produced at the output of the selector 50. The same offset is also used by the phase locked loop when the circuit is operating in continuous mode.

Figure 7:
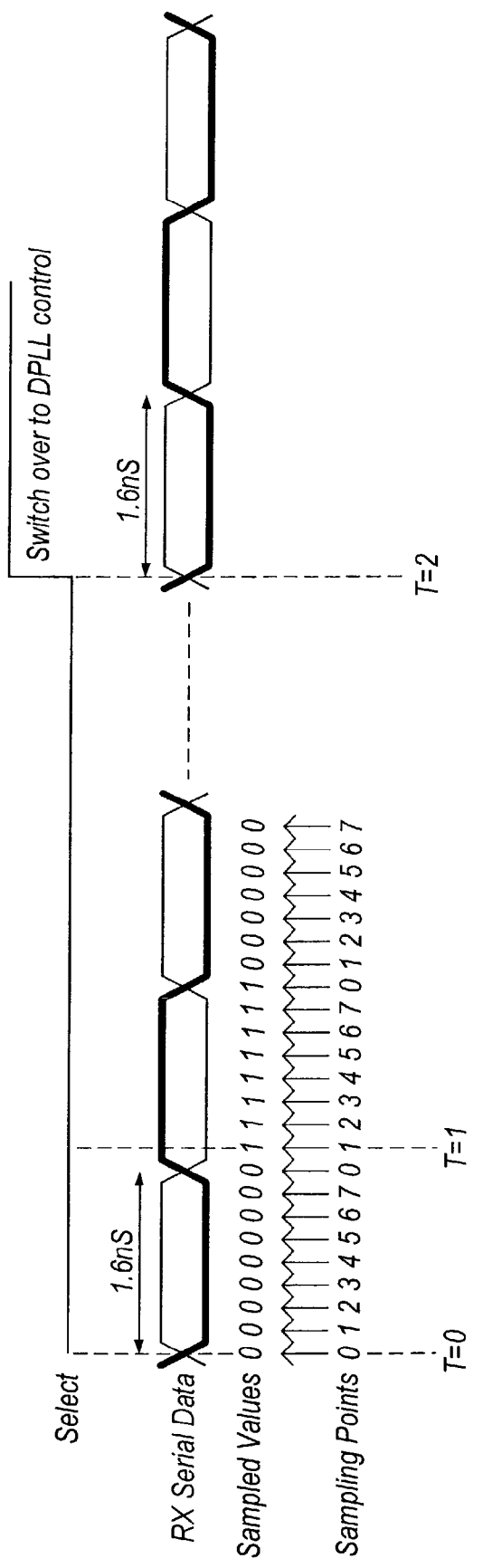
FIG. 7 illustrates the operation of the phase estimator of FIGS. 5 and 6.

An example of the operation of the phase detector will now be described with reference to FIG. 7. FIG. 7 shows an incoming serial data signal (RX serial data) which is at the start of a data burst. The data signal is sampled by eight multiphase clock signals, to give the sampled values shown. Due to their offset phases, the eight clock signals sample the data at regular intervals throughout a bit period, as indicated by the sampling points 0 to 7. FIG. 7 also shows a select signal, which controls the switch 42 in FIG. 4.

Referring to FIG. 7, at time T=0 the various clock signals start sampling the incoming data signal. The data is initially low, and so the sampled values are initially logic zero. At T=1, the sampled values start to change from logic zero to logic one. This occurs at sampling point 1, and so sampling point 1 is determined to be the sampling point at which a bit reversal occurred. The selector 50 in FIGS. 5 and 6 therefore selects the second of the eight tap signals at its input. The thus selected tap signal is fed by switch 42 in FIG. 4 to the phase interpolator 38 for use as an initial estimate of the desired phase of the clock signal.

At T=2 the select signal changes state, and the circuit is switched over to continuous mode. In this mode the tap signal from the digital loop filter 32 in FIG. 4 is fed to the phase interpolator 38, and the phase locked loop locks onto the data signal.

Figure 8:
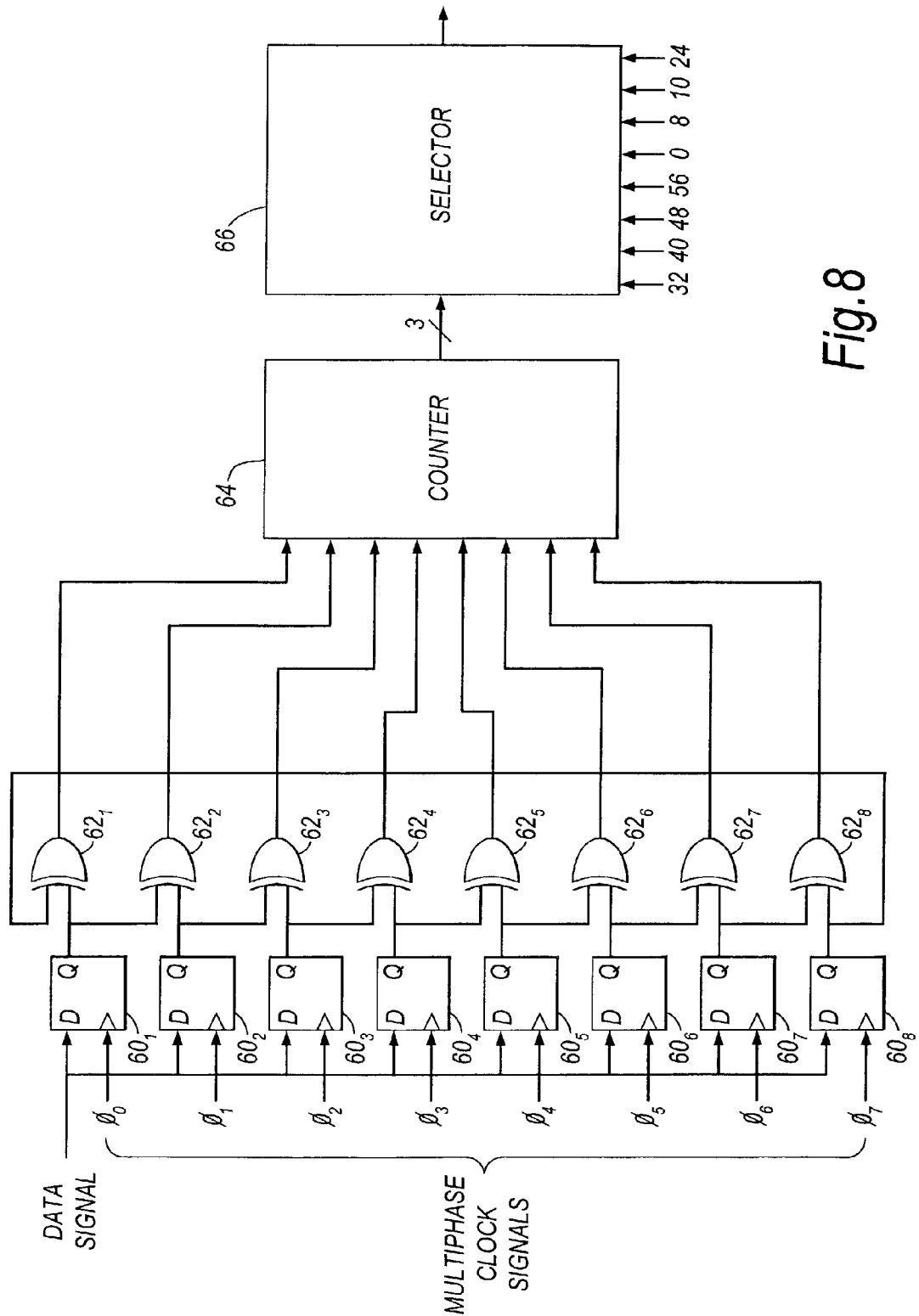
FIG. 8 shows parts of another embodiment of the phase estimator.

FIG. 8 shows parts of an alternative implementation of the phase estimator 40. The phase estimator shown in FIG. 8 comprises eight registers $60_1$ to $60_8$ and eight EXOR gates $62_1$ to $62_8$, which are the same as the corresponding parts in FIG. 6. However, the phase estimator of FIG. 8 also comprises a counter 64, which counts the number of times each of the EXOR gates produces a logic one signal. In this implementation, the counter 64 produces a three bit signal which indicates which one of the eight EXOR gates produced the most logic one signals. This three bit signal is fed to selector 66, which selects one of eight taps signals in dependence on the value of the three bit signal.

The phase estimator shown in FIG. 8 takes advantage of the fact that a number of data edges may be available for locking the clock signal to the incoming data. For example, if the data format shown in FIG. 2 is used, up to sixteen data transitions may be available. By counting the number of bit reversals associated with each sampling point, and determining which sampling point has the most bit reversals, a better estimate of the correct phase of the clock signal may be obtained, and spurious results may be avoided.

The counter 64 may operate over a predetermined number of cycles, in which case its output will indicate which of the EXOR gates produced a logic one signal the most times during those cycles. Alternatively, the counter may be arranged to output a signal once one of the EXOR gates has produced a predetermined number of logic one signals. In either case, the selector 66 is arranged to select one of the eight tap signals once the final output from the counter 64 is produced.

The counter 64 may also be arranged to output a "running total", which indicates which of the EXOR gates has produced a logic one signal the most times since, for example, the start of a data burst. This can allow an initial estimate of the desired phase of the clock signal to be made available as soon as the first data edge has been detected, and this estimate to be updated as more data edges are detected. Once a certain number of data edges have been detected, the counter may operate as a "sliding window", in which old results are discarded. In this implementation, the output of the counter 64 may indicate which of the EXOR gates has produced a logic one signal the most times, for example, during a predetermined number of clock cycles, or based on a predetermined number of detected data edges.

In a further implementation, the counter 64 is arranged to output a signal which is based on an average of the logic one signals which appear at its inputs.

Figure 9:
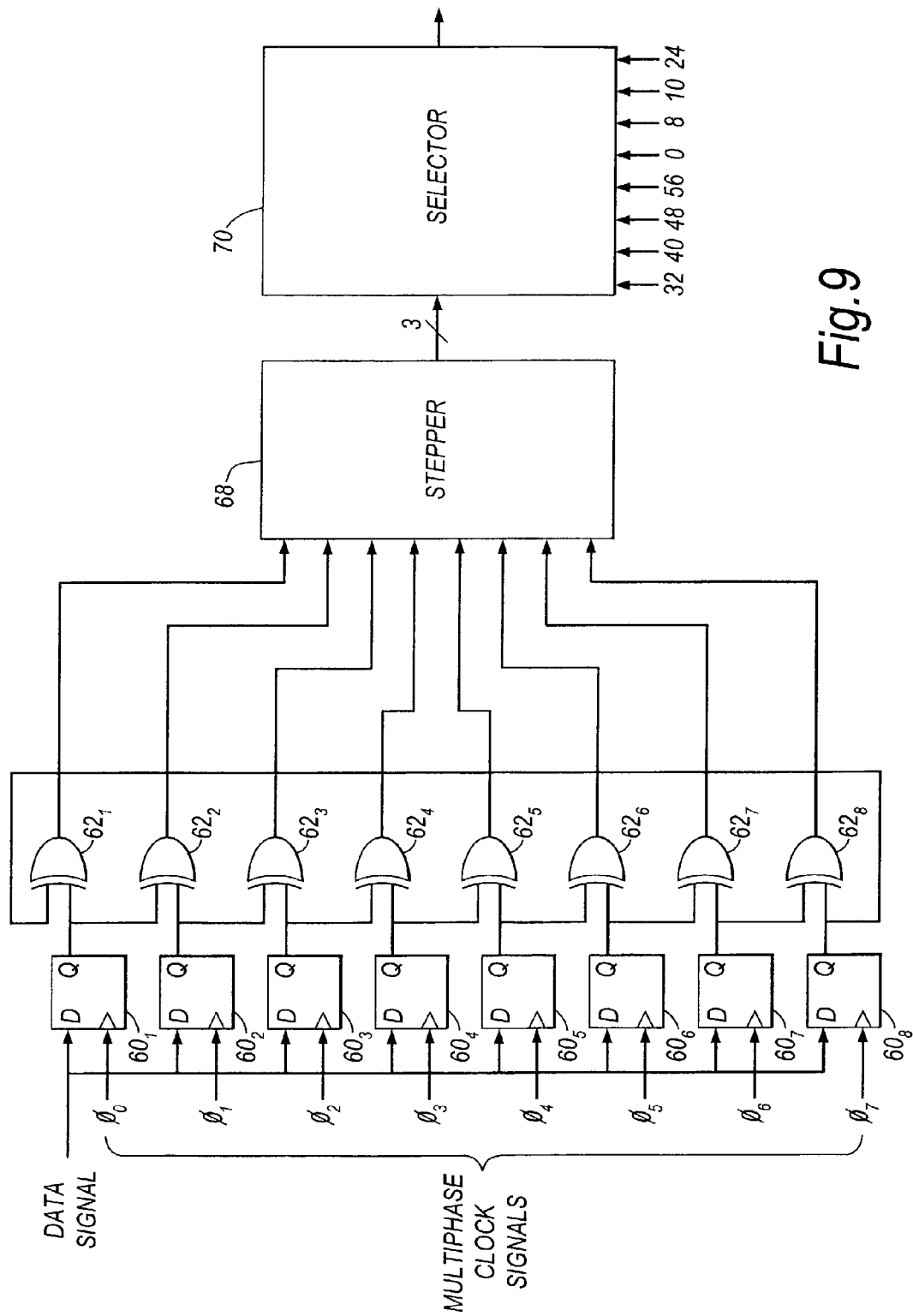
FIG. 9 shows parts of a further embodiment of the phase estimator.

FIG. 9 shows parts of another possible implementation of the phase estimator 40. The phase estimator shown in FIG. 9 comprises eight registers $60_1$ to $60_8$ and eight EXOR gates $62_1$ to $62_8$, which are the same as the corresponding parts in FIGS. 6 and 8. The phase estimator in this implementation also comprises stepper 68 and selector 70. The stepper 68 receives the eight input signals from the EXOR gates $62_1$ to $62_8$, and outputs a three bit signal which has a value corresponding to one of the eight input signals. The three bit signal output by the stepper 68 is used to select one of eight tap signals input to the selector 70.

In operation, if the output of the stepper 68 does not correspond to the input which is currently at logic one, then the stepper 68 changes its output so as to step towards the value that does correspond to the input that is currently at logic one. The stepper 68 may step its output by, for example, one value with each clock cycle, or by more than one value. This arrangement can allow an estimate of the desired phase of the clock signal to be produced quickly, while allowing the effects of spuriously detected data edges to be reduced.

When the phase estimator is first initialised, the stepper 68 has an output which corresponds to an arbitrary one of the eight input signals. If desired, following initialisation, the output of the stepper may first be set to correspond to the input which is at logic one once the first data edge has been detected. Alternatively the output of the stepper may simply be allowed to step towards its input at all times. Assuming that the input to the stepper remains constant and the output of the stepper steps by one value with each clock cycle, then it will take a maximum of four clock cycles for the output to correspond to the input.

Figure 10:
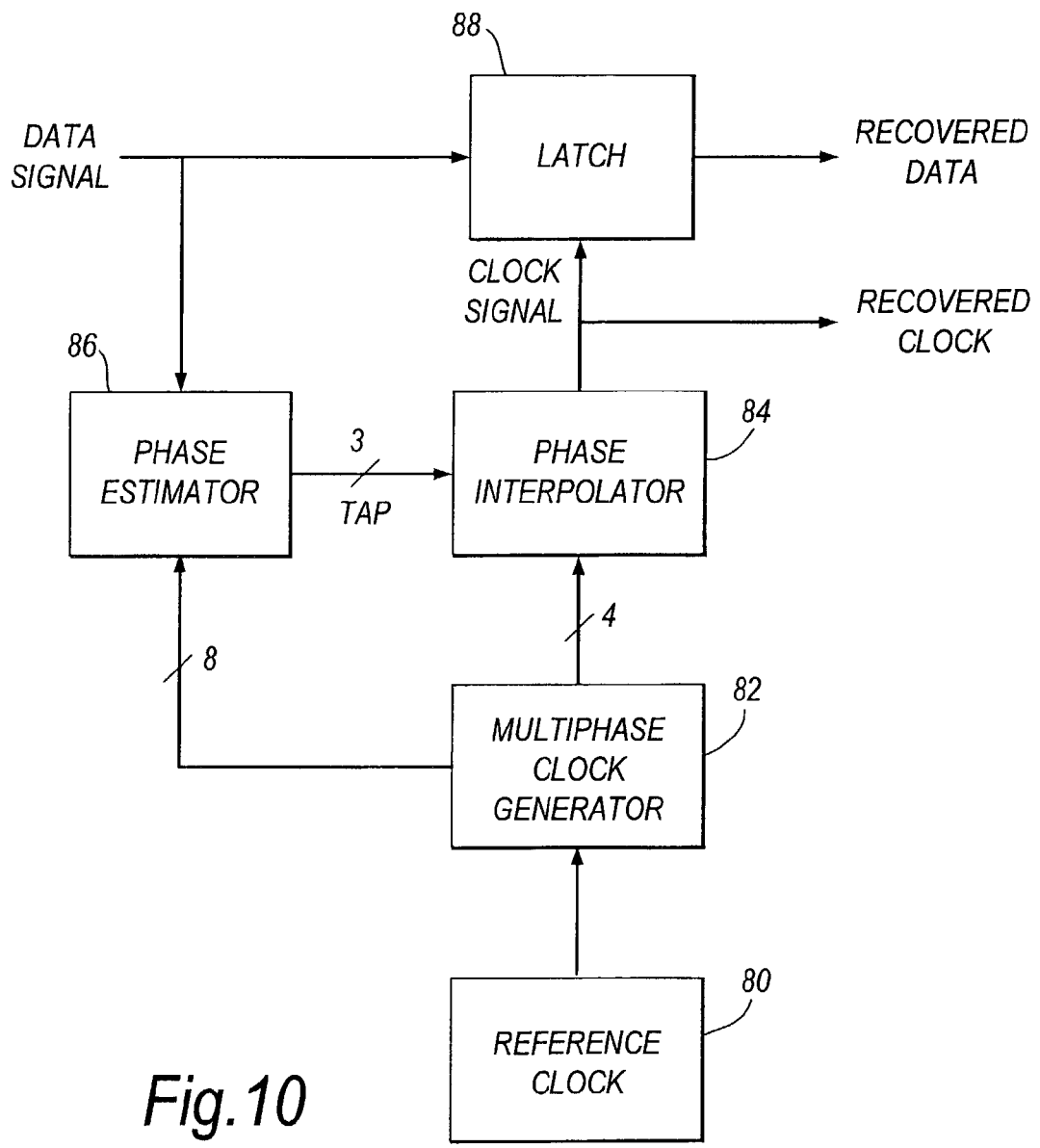
FIG. 10 shows parts of a clock recovery circuit according to a second embodiment of the present invention.

FIG. 10 shows parts of a clock recovery circuit according to another embodiment of the present invention. The clock recovery circuit in this embodiment comprises reference clock generator 80, multiphase clock generator 82, phase interpolator 84, phase estimator 86 and latch 88. The clock recovery circuit shown in FIG. 10 differs from that shown in FIG. 4 in that no digital phase locked loop is provided. Instead, the phase estimator 86 is used to continually set the phase of the clock signal output by the phase interpolator 84. The thus produced clock signal latches the data signal in latch 88 to produce the recovered data signal.

The phase estimator 86 may be in any of the forms described above with reference to the first embodiment. However, since the number of possible phases is determined by the phase estimator itself, rather than the digital loop filter 32 in FIG. 4, the output of the phase estimator is a 1-of-n signal, where n is the number of multiphase clock signals input to the phase estimator. Thus the inputs to the selector (such as selector 50 in FIG. 6, or selector 66 in FIG. 8, or selector 70 in FIG. 9) are chosen accordingly. In the example shown in FIG. 10, eight multiphase clock signals are input to the phase estimator 86 and the output of the phase estimator is a three bit (1-of-8) signal. However, the phase estimator could use a larger number of multiphase clock signals if desired, in order to set the phase of the clock signal with smaller gradations.

It will be understood that the present invention has been described above purely by way of example, and modifications of detail can be made within the scope of the invention. For example, while the phase estimator in the embodiments described above uses eight reference clock signals to sample the data, any desired number of reference clock signals having appropriately spaced phases could be used, and the phases need not be evenly spaced. Similarly, tap signals other than 1 of 64 tap signals could be used. The tap signals may be encoded, for example using Gray coding or thermometer coding or any other appropriate form of coding. Where appropriate, an encoder may be included in the circuitry in order to produce the required encoding.

In the embodiments described above a phase interpolator is used to produce the clock signal, but it will be appreciated that any other appropriate technique could be used to produce the clock signal. For example, sixty four multiphase clock signals (or some other number, depending on the number of possible values of the tap signal) could be produced, and one of those signals could be selected as the clock signal.

The clock signal may have any appropriate phase offset with respect to the data signal, and this may be preset, or adjustable. A separate latch may be provided for sampling the data signal, and the clock signal applied to that latch may have an adjustable offset.

The invention claimed is:

1. Clock recovery circuitry which is arranged to recover a clock signal from a data signal, comprising:
a sampler which samples the data signal at a plurality of sampling points;
a bit reversal detector which determines a sampling point at which the data signal changes state;
a phase selector which selects a phase from amongst a plurality of candidate phases based on a sampling point at which the data signal is determined to change state;
a phase detector which determines a difference between the phase of the clock signal and the phase of the data signal;
a filter which filters the output of the phase detector to produce a control signal;
a control signal selector which, in a first operating mode of said circuitry, supplies the selected phase from the phase selector and which, in a second operating mode of said circuitry, supplies the control signal from the filter; and
a phase setting unit which, in said first operating mode, sets the phase of the clock signal in dependence on the selected phase supplied by the control signal selector and which, in said second operating mode, sets the phase of the clock signal in dependence on the control signal supplied by the control signal selector,
wherein, a loop comprised of the phase detector, filter and phase setting unit is only closed in the second operating mode, and in the first operating mode, the loop is open and the phase setting unit is controlled based on the output of the phase selector.

2. Clock recovery circuitry according to claim 1, wherein the sampler samples the data signal with a plurality of sampling clock signals having substantially the same frequency, but different phases.

3. Clock recovery circuitry according to claim 2, further comprising a multiphase clock generator for producing the plurality of sampling clock signals.

4. Clock recovery circuitry according to claim 1 wherein the number of candidate phases is at least three.

5. Clock recovery circuitry according to claim 1, wherein the bit reversal detector compares the data sampled at a sampling point with the data sampled at a previous sampling point, thereby to determine a sampling point at which the data signal changes state.

6. Clock recovery circuitry according to claim 1, wherein the bit reversal detector is arranged to determine a sampling point at which the data signal changes state for a plurality of data transitions.

7. Clock recovery circuitry according to claim 1, wherein a signal indicating the sampling point at which the data signal is determined to have changed state is supplied from the bit reversal detector to the phase selector to determine which phase is selected by the phase selector.

8. Clock recovery circuitry according to claim 1, further comprising a selection control unit which produces a selection control signal which determines which phase is selected by the phase selector.

9. Clock recovery circuitry according to claim 8, wherein the selection control unit is arranged to receive a plurality of signals, each signal indicating a sampling point at which the data signal is determined to have changed state for a particular data transition, and to produce therefrom a signal for output to the phase selector.

10. Clock recovery circuitry according to claim 9, wherein sampling points occur periodically, and the selection control signal is a signal indicating at which sampling point the data signal is determined to have changed states the greatest number of times.

11. Clock recovery circuitry according to claim 9, wherein the selection control unit is arranged to change the value of the selection control signal in steps of a predetermined size.

12. Clock recovery circuitry according to claim 11, wherein the currently selected phase is moved towards the phase corresponding to the most recent sampling point at which the data signal is determined to have changed state one step at a time.

13. Clock recovery circuitry according to claim 1, wherein the phase selector is arranged to select, from amongst the plurality of candidate phases, a phase having a required offset from the phase of the data signal.

14. Clock recovery circuitry according to claim 1, wherein the phase detector, filter and phase setting unit form a phase locked loop.

15. Clock recovery circuitry according to claim 1, further comprising a control unit which controls the control signal selector.

16. Clock recovery circuitry according to claim 15 wherein the control unit is arranged to supply the selected phase from the phase selector to the phase setting unit during a first part of a data burst.

17. Clock recovery circuitry according to claim 1, wherein the control signal is a digital signal indicating one phase out of a predetermined number of phases.

18. Clock recovery circuitry according to claim 17, wherein the number of predetermined phases is different from the number of candidate phases for selection by the phase selector, and an output of the phase selector is a digital signal indicating one phase out of the predetermined number of phases.

19. Clock recovery circuitry according to claim 1, wherein the phase setting unit comprises a phase interpolator which is arranged to receive a plurality of clock signals having different phases, and to produce the clock signal from the plurality of clock signals.

20. A method of recovering a clock signal from a data signal, the method comprising:
sampling the data signal at a plurality of sampling points;
determining a sampling point at which the data signal changes state;
selecting a phase from amongst a plurality of candidate phases based on a sampling point at which the data signal is determined to change state;
determining a difference between the phase of the clock signal and the phase of the data signal and generating a phase difference signal representing said difference by a phase detector;
filtering the phase difference signal to produce a control signal by a filter; and
in a first operating mode, in which a loop comprising the phase detector, the filter, and a phase setting unit is open, employing the selected phase to set the phase of the clock signal, and in a second operating mode, in which the loop is closed employing the control signal to set the phase of the clock signal by the phase setting unit.

21. Clock recovery circuitry for recovering a clock signal from a data signal, comprising:
sampling means for sampling the data signal at a plurality of sampling points;
bit reversal detecting means for determining a sampling point at which the data signal changes state;
selecting means for selecting a phase from amongst a plurality of candidate phases based on a sampling point at which the data signal is determined to change state;
a phase detector for determining a difference between the phase of the clock signal and the phase of the data signal;
a filter for filtering the output of the phase detector to produce a control signal;
control signal selection means for supplying the selected phase from the selecting means in a first operating mode of said circuitry and for supplying the control signal from the filter in a second operating mode of said circuitry; and
setting means for setting the phase of the clock signal in dependence on the selected phase supplied by the control signal selecting means in said first operating mode, and for setting the phase of the clock signal in dependence on the control signal supplied by the control signal selection means in said second operating mode, wherein, a loop comprised of the phase detector, filter and setting means is only closed in the second operating mode, and in the first operating mode, the loop is open and the setting means is controlled based on the output of the selecting means.

* * * * *